March 5, 1929.  E. GOLDBERG  1,704,189

MOTION PICTURE CAMERA DRIVEN BY A SPRING MECHANISM

Filed Jan. 15, 1927  2 Sheets-Sheet 1

Inventor: *Emanuel Goldberg.*
Attorney: *William C. Linton.*

March 5, 1929. E. GOLDBERG 1,704,189
MOTION PICTURE CAMERA DRIVEN BY A SPRING MECHANISM
Filed Jan. 15, 1927   2 Sheets-Sheet 2

Inventor:
Emanuel Goldberg.

Attorney:
William C. Linton.

Patented Mar. 5, 1929.

1,704,189

UNITED STATES PATENT OFFICE.

EMANUEL GOLDBERG, OF DRESDEN, GERMANY.

MOTION-PICTURE CAMERA DRIVEN BY A SPRING MECHANISM.

Application filed January 15, 1927, Serial No. 161,431, and in Germany and France January 21, 1926.

The present invention relates to driven motion picture cameras and one of the principal considerations of the invention is the provision of a control mechanism for the driving means of such cameras, wherein the driving means may be automatically stopped when a predetermined length of film has been exposed and preventing the taking of undesired pictures or otherwise wasting the film.

A further object of the invention is to provide a control mechanism for spring motors which may be manually controlled for stopping or starting the motor or which may be manually set for automatically stopping the motor at a predetermined time.

Other important objects and advantages of the invention will be in part obvious and in part pointed out hereinafter.

In order that the invention may be readily understood by those skilled in the art, I have in the accompanying illustrative drawings and in the detailed following description based thereupon, set out one possible embodiment of the invention.

Figure 1:
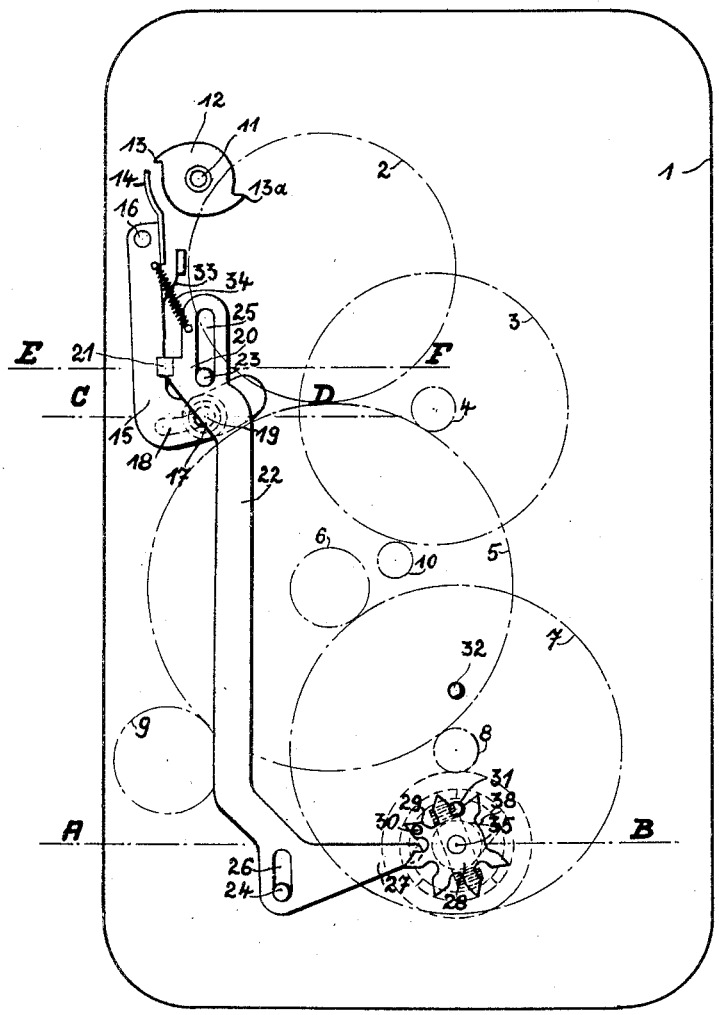
Figure 3:
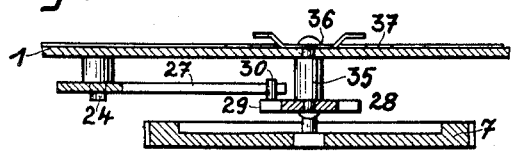
Figure 4:
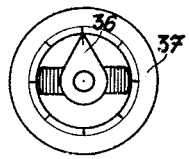
Figure 2:
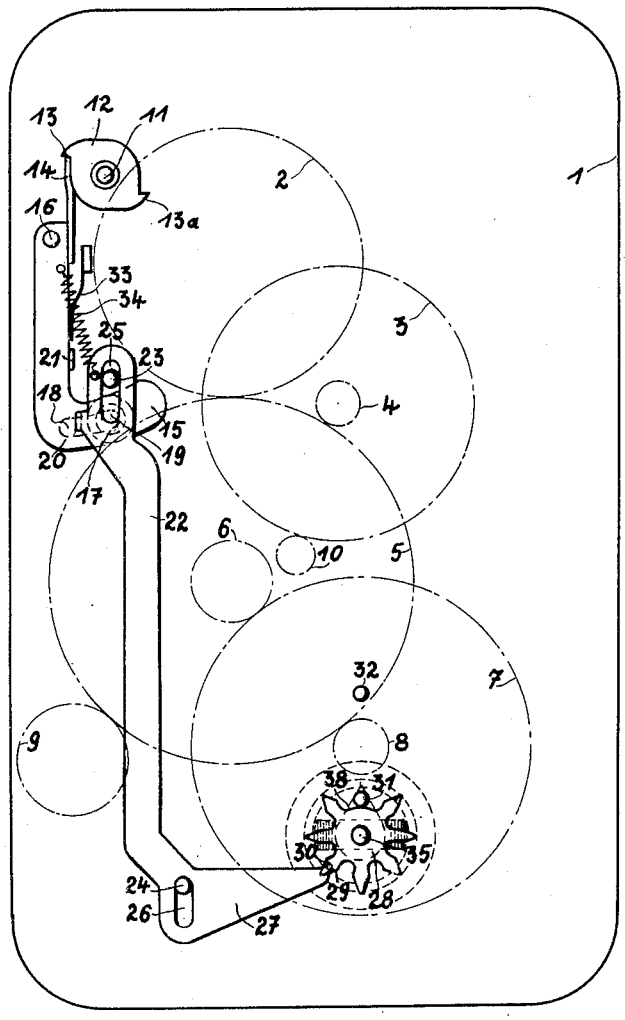
Figure 5:
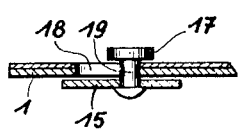
Figure 6:
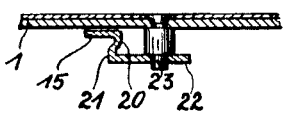

In these drawings:

Figure 1 is a side elevation of my improved control mechanism showing the same as applied to motor driven means of a motion picture camera, the latter being shown in dotted lines, Figure 2 is a similar view illustrating my invention in a locking position or when operated to cause the driving means of the camera to stop, Figure 3 is a horizontal section on line A—B of Figure 1, Figure 4 is a front elevation of the manually operable indicator, Figure 5 is a horizontal section on line C—D of Figure 1, and Figure 6 is a similar view taken on line E—F of Figure 1.

In the drawings, wherein like characters of reference will designate corresponding parts throughout, the numeral 1 designates a moving picture camera casing, preferably of rectangular shape and carrying the various gears of the film driving mechanism shown in dotted lines and designated herein for convenience by the numerals 2 to 10 inclusive, actuated by an ordinary spring motor well known in the art, adapted to drive the working and active parts of the apparatus in proper synchrony.

Mounted on and actuated by the shaft 11 of the spring motor is a disc 12 having diagonally opposite projections 13 and 13$^a$ providing means to lock, at times, the entire driving mechanism of the moving picture camera. This locking action is effected by the engagement of one shoulder 13 or 13$^a$ on disc 12 with a stop member 14 secured to one end of an L-shaped lever 15, pivoted at its upper portion to the camera casing 1, by means of a pin 16 or the like.

Secured to the lower end of this L-shaped lever 15 is a shaft 19 carrying a knob 17 arranged exteriorly of the casing 1, and this shaft being slidable in a slot 18 formed in said casing for the purpose of permitting the lever to be manually oscillated for moving the stop member into and out of the path of travel of the shoulder 13 or 13$^a$. A leaf spring 33 contacts with the lever 15 and normally holds the latter in the position as shown in Figure 2 whereby the stop member 14 may be positioned in the path of travel of the members 13 and 13$^a$ and the disc 12 which is connected to the motor of the driving means of the camera held against rotation.

Formed with the intermediate portion of the L-shaped lever 15 is a catch 21 adapted to have engagement with a hook 20 carried by a vertically extending rod 22. This rod 22 is provided with the slots 25 and 26 formed in its opposed ends for permitting the same to slide upon the pins 23 and 24 secured to the casing 1. A coil spring 34 has one end connected to the upper end of the rod 22 and its opposite end connected to the lever 15 adjacent its first connection 16. This coil spring 34 has the tendency of holding the rod 22 in its raised position as illustrated in Figure 1.

Right angularly disposed upon the lower end of rod 22 and preferably formed integrally therewith, is an arm 27 extending in proximity of a shaft 35 carried by the casing 1 and which has fixedly mounted upon one end thereof a toothed disc 28, a tooth 29 of which carries a pin 30 adapted, at times, to come into contact with arm 27.

The opposite end of shaft 35 extends outside of the casing 1 and has secured thereto an indicator 36 capable of being set at any desired point on a graduated scale 37, fixed to the casing 1. Obviously through the setting of the indicator 36 the tooth 29 carrying pin 30 will be caused to lay at points more or less distant from arm 27 thereby hurrying or retarding the release of the locking mechanism as described.

Suitably mounted upon the gear 7 of the film driving mechanism are pins 31 and 32 adapted with revolution of said gear 7 to be engaged between the teeth of disc 28 thereby rotating the same.

When the film driving mechanism is set in motion the pins 31 and 32 mounted on the wheel 7 will engage the toothed disc 28 carrying step by step the pin 30 secured on tooth 29 towards the arm 27, until it comes into contact with said arm. By further rotation of the disc 28, the rod 22 will then be forced downwardly disengaging the catch 20 from the hook 21. The stop member 14, through the pivoted action of the released lever 15, will engage one of the shoulders 13 or 13ª of disc 12 locking the entire mechanism of the camera, as shown in Fig. 2.

It might be desirable, at times, to expose the entire strip of film within the camera without stopping the driving mechanism. For this purpose a tooth may be omitted on disc 28, forming a gap, designated at this time by the numeral 38, which will correspond to the zero mark on scale 37. When set to this point, it is obvious that the pins 31 and 32 passing freely through the gap 38, fail to actuate the toothed disc 28 and the locking device.

When the control device is in the position as shown in Figure 2 the motor and driving means of the camera are at rest and when it is desired to expose the film within the camera the operator moves the lever 15 through the knob 17 until the stop member is out of contact with the projections 13 and 13ª thereby permitting the motor to rotate the shaft 11 and as long as the operator retains the lever in this position the driving means will continue to actuate the camera as the indicator 36 is at zero so that the pins 31 and 32 pass through the gap 38 of the toothed wheel 28.

From the foregoing it is obvious that as long as the rod 22 is retained in its lowermost position the lever 15 is free to be manually operated by moving the knob 17 so that the operator may start and stop the motor at will. However, to automatically control the motor the indicator 36 must be set to the desired length of film that is to pass through the camera and in doing so the rod 22 is released whereat the spring 34 will elevate the same. The knob 17 is then moved to a starting position so that the lever 15 will assume the position of Figure 1 whereby the hook 21 carried by the rod 22 will engage the catch 20 of the lever 15 for locking the lever and rod together. The motor will now drive the camera mechanism which includes the wheel 7 causing the pins 31 and 32 carried thereby to rotate the wheel 28 until the pin 30 carried by the latter engages the arm 27 and again forces the rod 22 downwardly until the catch 20 and hook 21 are disengaged for releasing the lever 15. Upon releasing the lever 15 the leaf spring 33 will cause the latter to move about its pivot 16 until one of the projections 13 or 13ª engage the stop 14 whereat the motor will again be held against rotation. From the foregoing it is obvious that a predetermined length of film may be caused to pass through the camera by setting the indicator 36 or the film driving mechanism may be manually controlled through the knob 17.

Obviously, the construction shown is capable of considerable modification and those modifications within the scope of my claim, I consider within the spirit of my invention.

I claim:

1. A control mechanism for moving picture cameras driven by a spring motor comprising, a casing, a rotatable member mounted for movement within the casing and secured to the spring motor, a pivoted lever engageable at times with said member for holding the spring motor against movement, a rod cooperatively associated with said lever to automatically release the same for engaging the rotatable member when a predetermined length of film has been exposed, and means whereby to selectively regulate the length of film to be exposed.

2. A control mechanism for moving picture cameras driven by a spring motor comprising, a pivoted lever engageable at times with the motor for holding the same against movement, a control rod cooperatively associated with said lever and movably mounted within the camera, a toothed wheel adapted to automatically operate said rod at a predetermined time, and means actuated by the spring motor and engageable with the toothed wheel to carry the same into engagement with said rod.

3. A control mechanism for moving picture cameras driven by spring motor comprising, a shouldered disc mounted on and actuated by the spring motor, a pivoted L-shaped lever engageable at times with said disc for holding the motor against movement, a control rod cooperatively associated with said lever for releasing the same, a toothed wheel adapted to automatically operate said rod at a predetermined time, and means actuated by the spring motor and engageable with the toothed wheel for carrying the latter into engagement with the control rod.

4. The combination with a moving picture camera having a spring driving mechanism, a casing for said camera, a lever pivotally supported within said casing, means for normally retaining said lever in engagement with the spring driving mechanism of the camera for retaining the latter against movement, and a knob connected to said lever and extending exteriorly of said casing whereby said lever may be manually moved out of engagement with the spring driving mechanism of the camera.

5. The combination with a moving picture camera having a spring driving mechanism including a rotatable disc, a casing for the camera, a lever pivotally mounted within said casing, a leaf spring for normally holding said lever to engagement with said disc, a knob carried by said lever and extending exteriorly of said casing whereby said lever may be manually moved out of engagement with said disc, locking means for retaining said lever out of engagement with said disc and means controlled by the spring driving mechanism of the camera for releasing said locking means.

In testimony whereof, I affix my signature.

EMANUEL GOLDBERG.